United States Patent
Pang et al.

(10) Patent No.: US 11,790,947 B1
(45) Date of Patent: Oct. 17, 2023

(54) IDLE POWER SAVING FOR ACTUATOR DEVICE

(71) Applicant: Seagate Technology LLC, Fremont, CA (US)

(72) Inventors: Tze Ming Pang, Shugart (SG); MingZhong Ding, Shugart (SG); ChanFan Lau, Shugart (SG); Chi Sern Tan, Shugart (SG); Ye HaiBo, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/735,380

(22) Filed: May 3, 2022

(51) Int. Cl.
  *G11B 19/04* (2006.01)
  *G11B 5/48* (2006.01)

(52) U.S. Cl.
  CPC ............ *G11B 19/047* (2013.01); *G11B 5/486* (2013.01); *G11B 5/4813* (2013.01)

(58) Field of Classification Search
  None
  See application file for complete search history.

(56) References Cited

U.S. PATENT DOCUMENTS

| | | | |
|---|---|---|---|
| 4,774,699 A * | 9/1988 | Giddings | G11B 27/105 369/111 |
| 4,783,706 A | 11/1988 | Shoji et al. | |
| 5,121,370 A * | 6/1992 | Yanagi | G11B 7/08529 369/53.28 |
| 5,182,685 A | 1/1993 | Krause et al. | |
| 5,345,347 A | 9/1994 | Hopkins et al. | |
| 5,412,809 A | 5/1995 | Tam et al. | |
| 5,859,738 A * | 1/1999 | Forehand | G11B 5/6005 |
| 5,986,846 A * | 11/1999 | Goker | G11B 15/1841 |
| 6,469,860 B1 * | 10/2002 | Hedding | G11B 5/584 |
| 6,819,513 B2 | 11/2004 | Chainer et al. | |
| 6,975,482 B1 * | 12/2005 | Guo | G11B 5/5552 |
| 7,215,499 B1 | 5/2007 | Li et al. | |
| 7,324,296 B1 * | 1/2008 | DeRosa | G11B 5/5547 360/59 |
| 7,342,740 B1 * | 3/2008 | Lee | G11B 5/59622 |
| 7,554,773 B2 | 6/2009 | Zhu et al. | |
| 7,595,957 B2 * | 9/2009 | Liu | G11B 5/5547 360/78.07 |
| 7,702,848 B2 | 4/2010 | Sutardja et al. | |
| 7,853,809 B2 | 12/2010 | Zhang et al. | |
| 7,904,604 B2 | 3/2011 | Lum et al. | |

(Continued)

*Primary Examiner* — Peter Vincent Agustin
(74) *Attorney, Agent, or Firm* — Christian W. Best

(57) ABSTRACT

Systems and methods are disclosed for an actuator device or actuator control device to implement a low power savings mode. For example, a device can comprise an actuator arm including a first actuator and a second actuator, the second actuator configured to refine a movement of the actuator arm to a more precise position than use of merely the first actuator. A device can also comprise a control system configured to determine when the device is in an idle state and, when the device is in the idle state, disable the second actuator and perform a positional seek operation with the second actuator disabled. Power savings can occur from disabling the second actuator, which may also include disabling associated circuitry, such that it does not consume power or consumes a nominal (e.g., negligible or insignificant) amount of power during the associated seek operation.

20 Claims, 5 Drawing Sheets

(56) References Cited

U.S. PATENT DOCUMENTS

| | | | | |
|---|---|---|---|---|
| 8,134,798 B1* | 3/2012 | Thelin | G11B 20/1258 |
| | | | 360/39 |
| 8,254,222 B1* | 8/2012 | Tang | G11B 5/556 |
| | | | 369/44.29 |
| 8,300,348 B1* | 10/2012 | Liu | G11B 5/5547 |
| | | | 360/78.04 |
| 8,335,049 B1* | 12/2012 | Liu | G11B 19/048 |
| | | | 360/78.05 |
| 8,902,539 B1 | 12/2014 | Liu et al. | |
| 8,924,641 B2 | 12/2014 | Trantham et al. | |
| 8,929,022 B1* | 1/2015 | Huang | G11B 5/5552 |
| | | | 360/78.05 |
| 8,934,203 B2 | 1/2015 | Hanya et al. | |
| 8,988,811 B1* | 3/2015 | Ding | G11B 5/5547 |
| | | | 360/78.04 |
| 9,390,749 B2 | 7/2016 | Ferris et al. | |
| 10,976,795 B2 | 4/2021 | Nayak et al. | |
| 2001/0005295 A1* | 6/2001 | Okuyama | G11B 5/5552 |
| 2002/0097516 A1* | 7/2002 | Gan | G11B 21/21 |
| 2003/0156345 A1 | 8/2003 | Fayeulle et al. | |
| 2005/0144491 A1 | 6/2005 | Zayas | |
| 2005/0174678 A1 | 8/2005 | Zayas et al. | |
| 2005/0207056 A1* | 9/2005 | White | G11B 5/5552 |
| 2012/0281310 A1* | 11/2012 | Lim | G11B 5/5582 |
| | | | 360/77.02 |

\* cited by examiner

US 11,790,947 B1

IDLE POWER SAVING FOR ACTUATOR DEVICE

SUMMARY

In certain embodiments, a device may comprise an actuator arm including a first actuator and a second actuator, the second actuator configured to refine a movement of the actuator arm to a more precise position than use of merely the first actuator. The device can also comprise a control system configured to determine when the device is in an idle state, and when the device is in the idle state, disable the second actuator and perform a positional seek operation to position the actuator arm with the second actuator disabled, and when the device is not in the idle state, perform a positional seek operation for the actuator arm utilizing the first actuator and the second actuator to position the actuator arm.

In certain embodiments, a device may comprise a control system configured to be coupled to an actuator arm having a first actuator and a second actuator. The control system further configured to determine when the device is in an idle state, and when the device is in the idle state, disable the second actuator and perform a positional seek operation to position the actuator arm with the second actuator disabled.

In certain embodiments, a process may comprise implementing a device control method, the device having an actuator arm with a first actuator and a second actuator, the method including determining when the device is in an idle state, and when the device is in the idle state, disabling the second actuator and performing a positional seek operation to position the actuator arm with the second actuator disabled.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the processes, methods, and functions described herein may be implemented as one or more software programs running on one or more computer processors or controllers. Dedicated hardware implementations including, but not limited to, application specific integrated circuits (ASIC), programmable logic arrays, system-on-chip (SoC), and other hardware devices can likewise be constructed to implement the circuits, functions, processes, and methods described herein. Processes, methods, and functions may be performed by modules or engines, both of which may include one or more physical components of a computing device (e.g., logic, circuit, processor, controller, etc.) configured to perform a particular task or job, or may include instructions that, when executed, can cause a processor or control system to perform a particular task or job, or may be any combination thereof. Further, the processes, methods, and functions described herein may be implemented as a computer readable storage medium or memory device including instructions that, when executed, cause a processor to perform the methods. While examples provided herein are given with respect to data storage devices, the innovations hereof can be applicable to other actuator implementations.

Figure 1:
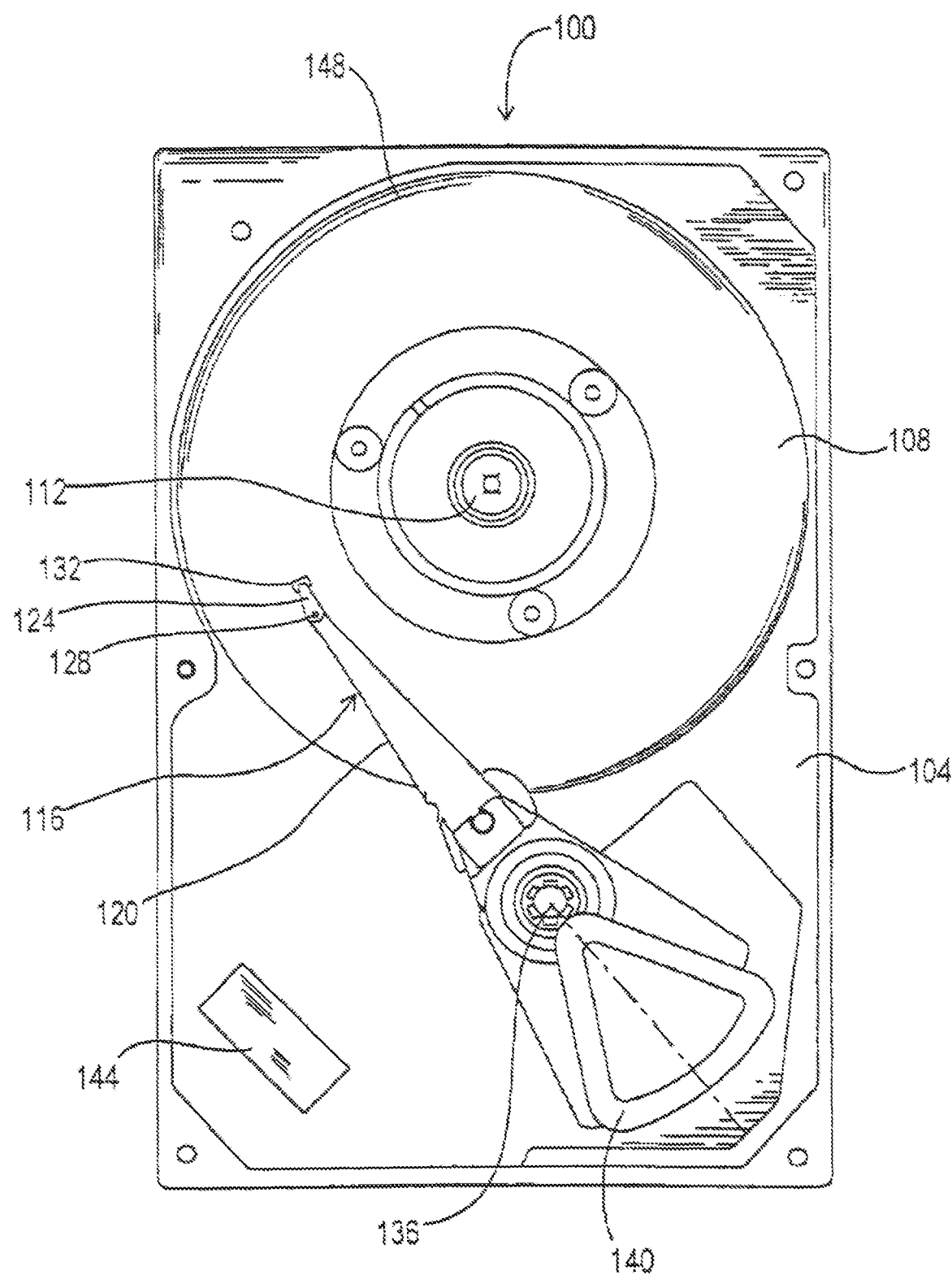
FIG. 1 is a diagram of an actuator device having an idle power saving mode, in accordance with certain embodiments of the present disclosure.

FIG. 1 is a diagram of an actuator device 100 having an idle power saving mode, in accordance with certain embodiments of the present disclosure. The actuator device 100 may be a data storage device (DSD) that utilizes an actuator 116 to store or retrieve data, such as a hard disc drive (HDD) or a hybrid drive. A DSD may include a base or housing 104, into which one or more disc storage mediums 108 may be installed (e.g., the DSD may include one or more vertically aligned discs 108). The disc 108 may be a magnetic storage disc, an optical disc, or any other disc data storage medium. Data may be stored to the disc 108 on a plurality of concentric data tracks 148, or other patterns, on the surface of the disc 108. Data may be written to or read from the disc 108 while the disc 108 spins around a central shaft 112 rotated via a spindle motor.

Data may be written to or retrieved from the disc 108 via one or more heads 132 (e.g., a magnetic transducer head with read or write elements) mounted to an actuator arm assembly 116. The actuator arm assembly 116 may include a first actuator 140 (e.g., a voice coil motor (VCM)) which can control a first, coarse actuation of the arm assembly 116 by pivoting the arm assembly 116 on a pivot shaft or bearing 136. As the actuator arm assembly 116 pivots on the pivot shaft 136, the head 132 can be positioned over any part of the radius of the disc 108 between an inner diameter (ID) near the spindle 112 and an outer diameter (OD) near the edge of the disc 108 opposite the ID.

The actuator arm assembly 116 can include a main arm portion 120 affixed to, or constructed as part thereof, the first actuator 140. At the opposite end of the main arm portion 120 may be affixed a head gimbal assembly (HGA), which can include the head 132. In various embodiments, the actuator 116 can also include a suspension or flexure element 124 on the distal end of the main arm portion 120 from the first actuator 140, attached to the main arm portion 120 via coupling 128.

The actuator device 100 can also include a control system 144 for controlling operations of the actuator device 100. The control system can be one or more controller, processor, circuitry, firmware, other modules, or any combination thereof. The control system 144 can include an idle power saving mode for the actuator device 100.

During seek operations to the disc 108, the head 132 can be positioned over a selected location (e.g., a desired track 148) by moving the head 132 using one or more actuators on the actuator arm 116. The individual data tracks 148 may be extremely narrow, and accordingly the head 132 may need to be precisely positioned over a desired track for data access operations. When the head 132 is moved to a new track, minute positional corrections may need to be performed until the head has settled over the target track. In a single stage servo system, the position of the head 132 may be controlled entirely by a single coarse actuator, such as VCM 140. The VCM 140 may be able to quickly make large adjustments to the positioning of the actuator arm 116, but may require a long time or many adjustments to settle the head 132 over a target track.

Accordingly, one or more additional actuators may be added to the actuator arm 116, to make smaller, more precise adjustments to the position of the head 132, and thereby accelerate the settling process. The additional actuator(s) may comprise one or more microactuators, milliactuators, or a combination thereof (all generally, such as herein, referred to as microactuators). In some embodiments, the microactuators may comprise piezoelectric actuators (sometimes referred to as "PZT" herein, based on the lead-zirconate-titanate material often used in piezoelectric devices). For example, a first microactuator may be collocated at or near the head 132 (e.g., between the suspension 124 and the head 132) and configured to adjust a fine position of just the head 132. A servo system with a VCM 140 and one or more microactuators may be referred to as a multi-stage actuated servo system. A multi-stage actuated servo system may include any number of actuators positioned on an actuator arm 116. The further down the actuator arm 116 from the pivot shaft 136 an actuator is positioned, such actuator can be configured to make smaller but more precise positional adjustments to the head 132.

In another example, a second microactuator may be positioned at coupling 128, between the main arm element 120 and the suspension 124, allowing the second microactuator to adjust a position of the suspension 124 and the head 132, which together may be referred to as a head suspension assembly (HSA). A servo system with two actuators, such as a VCM 140 and a microactuator 128, may be referred to as a two-stage servo system, whereas a servo system with three actuators may be referred to as a three-stage servo system and so on.

Any additional actuator may consume additional power during a seek operation or idle mode as compared to the power consumed merely by the VCM 140. As described in various embodiments and combinations herein, the actuator device 100 can reduce its power consumption by implementing a power saving mode that includes disabling one or more microactuators and associated circuitry during an idle mode, such as when tight track following is not required. In some embodiments, an actuator control system, such as a servo controller, can determine when an idle mode is enabled based on one or more seek commands and can then disable the microactuator(s) to save power during idle mode seek operations. Power savings come from the disabled actuator(s) and, as applicable, associated circuitry that do not consume power, or consumes a nominal (e.g., negligible or insignificant) amount of power, during an associated seek operation.

Figure 2:
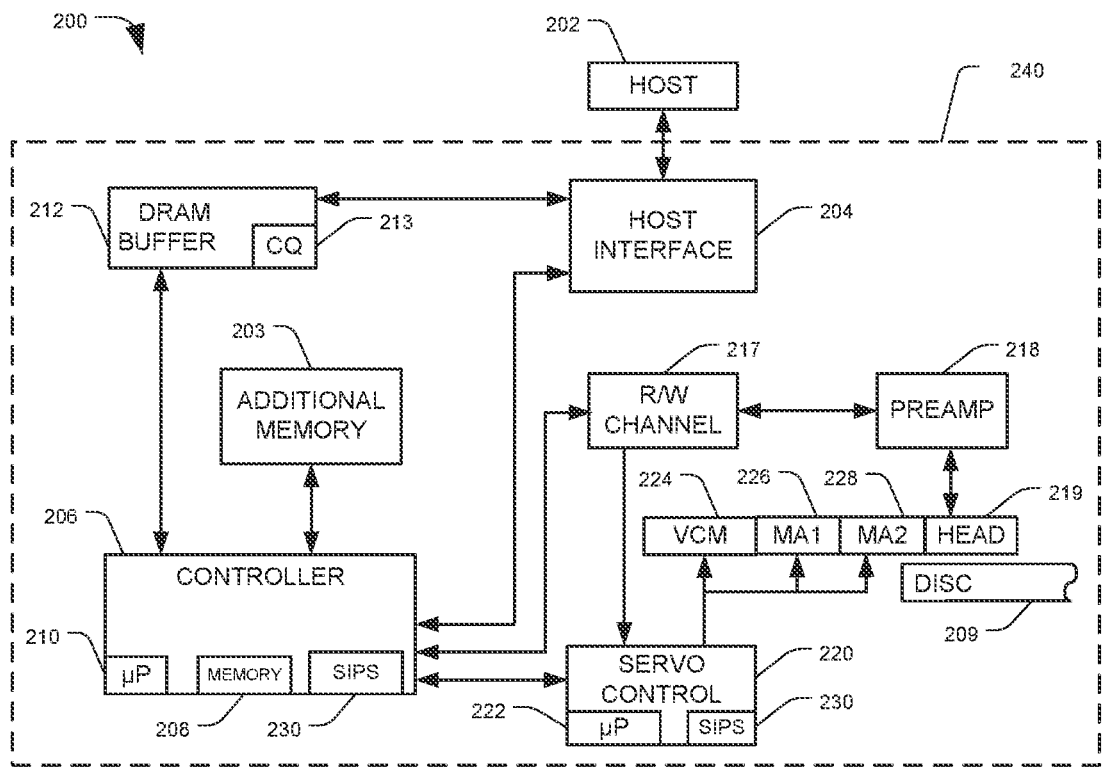
FIG. 2 is a functional block diagram of a system with an actuator having an idle power saving mode, in accordance with certain embodiments of the present disclosure.

FIG. 2 is a functional block diagram of a system 200 with an actuator device 240 having an idle power saving mode, in accordance with certain embodiments of the present disclosure. Specifically, FIG. 2 provides a functional block diagram of an example actuator device 240 as implemented in a data storage device (DSD), which may be an example of the actuator device 100 of FIG. 1. A DSD may also be referred to as hard disc drive (HDD) or hybrid drive, according to some embodiments. The device 240 can communicate with a host device 202 via a hardware or firmware-based interface circuit 204. The interface 204 may comprise any interface, either wired or wireless, that allows communication between a host 202 and a device 240, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, or Ethernet, among others. The interface 204 may include a connector that allows the device 240 to be physically removed from the host 202. The device 240 may have a casing housing the components thereof, such as housing 104.

The buffer 212 can temporarily store data during read and write operations, and can include a command queue (CQ) 213 where multiple operations can be temporarily stored pending execution. Commands arriving over the interface 204 may automatically be received in the CQ 213 or may be stored there by controller 206, interface 204, or another component.

The device 200 can include a programmable controller 206, which can include associated memory 208 and processor 210. The controller may execute firmware (FW) (e.g., instructions stored to a memory, such as memory 208) to control the operations of the device 200. In some embodiments, the controller 206 may control data storage device operations, such as seeks for reads and writes to the disc memory 209, storage of data to the additional memory 203, or any combination thereof. The additional memory 203 may include volatile memory such as dynamic random access memory (DRAM) or static RAM (SRAM), nonvolatile solid state memory such as NAND flash memory, read-only memory (ROM), or any other memory type. The additional memory 203 can function as a working memory for storing temporary data, a cache to store recently or frequently read or written data, or data likely to be read soon, or for other temporary data storage. Further, additional memory 203 may also function as main long-term storage instead of or in addition to disc(s) 209. A DSD containing multiple types of nonvolatile storage mediums, such as a disc(s) and flash, may be referred to as a hybrid storage device. The memory 208 may similarly include DRAM, SRAM, or similar volatile memory, and may store FW instructions for use during device operation, cached data, or other information.

In some embodiments, the device 200 can also include a read-write (R/W) channel 217, which can encode data during write operations and reconstruct and decode user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element.

A servo control circuit 220 may use servo data to provide the appropriate current to the primary actuator 224, sometimes called a voice coil motor (VCM), to position the head(s) 219 over a desired area of the disc(s) 209 by moving an adjustable arm on which the head(s) 219 are mounted. The servo control 220 may also control movement of one or more additional actuators on an actuator arm, such as a first microactuator (MA1) 226 and a second microactuator (MA2) 228. The controller 206 can communicate with a processor 222 of the servo control circuit 220 to move the head(s) 219 to the desired locations on the disc(s) 209 during execution of various pending commands in the command queue 213.

The additional actuators, such as the first microactuator (MA1) 226 and the second microactuator (MA2) 228, may consume additional power during a seek operation or idle mode as compared to the power consumed merely by the VCM 140. As described in various embodiments and combinations herein, the servo control circuit 220 can reduce the power consumption of the actuators by implementing a power saving mode that includes disabling one or more microactuators and associated circuitry during an idle mode, such as when tight track following is not required. In some embodiments, the servo control circuit 220 can determine when an idle mode is enabled based on one or more seek commands and can then disable the microactuator(s) to save power during idle mode seek operations. Power savings come from the disabled actuator(s) and, as applicable, associated circuitry that do not consume power, or consumes a nominal (e.g., negligible or insignificant) amount of power, during an associated seek operation.

Figure 3:
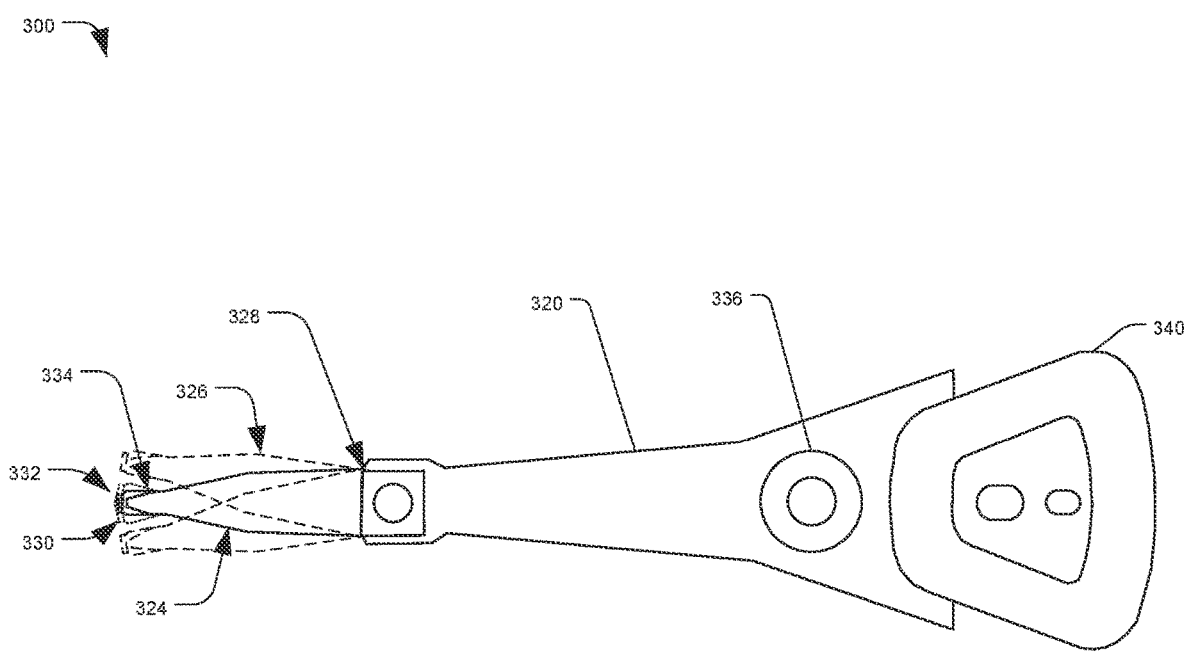
FIG. 3 is a diagram of a multi-actuator assembly having an idle power saving mode, in accordance with certain embodiments of the present disclosure.

FIG. 3 is a diagram of a multi-actuator assembly 300 having an idle power saving mode, in accordance with certain embodiments of the present disclosure. Specifically, FIG. 3 provides a diagram of an example actuator arm 300 that may be utilized with a disc storage media in a HDD or hybrid drive, which may be an example of actuator arm assembly 116 of FIG. 1 or VCM 224 and head 219 of FIG. 2.

The actuator arm assembly 300 may include a first actuator 340, a pivot shaft or bearing 336, and a main arm portion 320. The first actuator 340 may include a coarse actuator, such as a voice coil motor (VCM), for controlling fast, large-stroke movements of the actuator arm assembly 300. The first actuator 340 may control the actuator arm assembly 300 to pivot on the pivot shaft 336 in order to adjust a position of the head 332 with respect to a data storage disc, as discussed herein.

At the distal end of the main arm portion 320 may be affixed a suspension or flexure element 324, which, in some embodiments, may support a head gimbal assembly (HGA) including a head element 332 (e.g., one or more data transducer heads, such as a read/write head). In a DSD implementation, a combined suspension 324 and HGA 332 may be referred to as a head suspension assembly (HSA).

The actuator arm assembly 300 may include one or more actuators, such as a microactuator, in addition to the first actuator 340. A first microactuator 334 may be located at the distal end of the main arm portion 320, such as co-located with head 332 as positioned between the suspension 324 and the head 332. The first microactuator 334 may adjust a positioning of the end portion, such as head 332, by directly moving the end portion over a limited stroke, as indicated by dashed lines 330.

In some embodiments, a second microactuator 328 may be located between the main arm element 320 and the suspension 324. The second microactuator 328 may adjust a positioning of the end portion, such as head 332, by moving the end portion over a limited stroke, as indicated by dashed lines 326. The second microactuator 328 may have a broader range of motion than the first microactuator 340, while the first actuator 340 may have an even broader range of motion than any of the microactuators.

Together, the first actuator 340 and the first microactuator 328 (or the second microactuator 334, or all of them) may comprise a multi-stage servo system, and may allow rapid seeking and settling to a selected location (e.g., a target disc track). For example, the first actuator 340 may rapidly seek across a surface of a disc memory (e.g. a macro adjustment of the head 332 position), but may slightly overshoot or undershoot the target track. Microactuator(s) 328 or 334 may provide micro adjustments to the head 332 position to compensate for any overshoot or undershoot from the first actuator 340. If the first actuator 340 overshoots or undershoots a position (e.g., a target track), the first actuator 340 may be minutely adjusted until adjustments from the microactuators 328 or 334 are no longer needed to arrive at a correct position, such as the head 332 over a target track. That is, as the positioning of the first actuator 340 is corrected, the microactuators 328 or 334 may correspondingly adjust back to a default (e.g., straight) alignment. Further, even after settling on a position (e.g., a track and performing track following), the actuator may need to undergo minute adjustments to re-position (e.g., re-center over a track), such as due to repeatable and non-repeated run out errors. The microactuator 328 or 334 may be better suited to quickly make minor position adjustments than a coarse main actuator, such as a VCM 340.

The first microactuator 328 and the second microactuator 334 consume additional power during a seek operation or idle mode as compared to the power consumed merely by the first actuator 340, which is an example of VCM 140 of FIG. 1. As described in various embodiments and combinations herein, a control circuit can reduce the power consumption of the multi-actuator system 300 by implementing a power saving mode that includes disabling one or more microactuators and associated circuitry, such as during an idle mode when tight track following may not be required or in other situations where tight track following may not be required. In some embodiments, the control circuit can determine when an idle mode is enabled based on one or more seek commands and can then disable the first microactuator 328, the second microactuator 334, or both to save power during idle mode seek operations. Power savings come from not utilizing the disabled actuator(s) and, as applicable, associated circuitry during an associated seek operation (e.g., idle mode seek operations).

Figure 4:
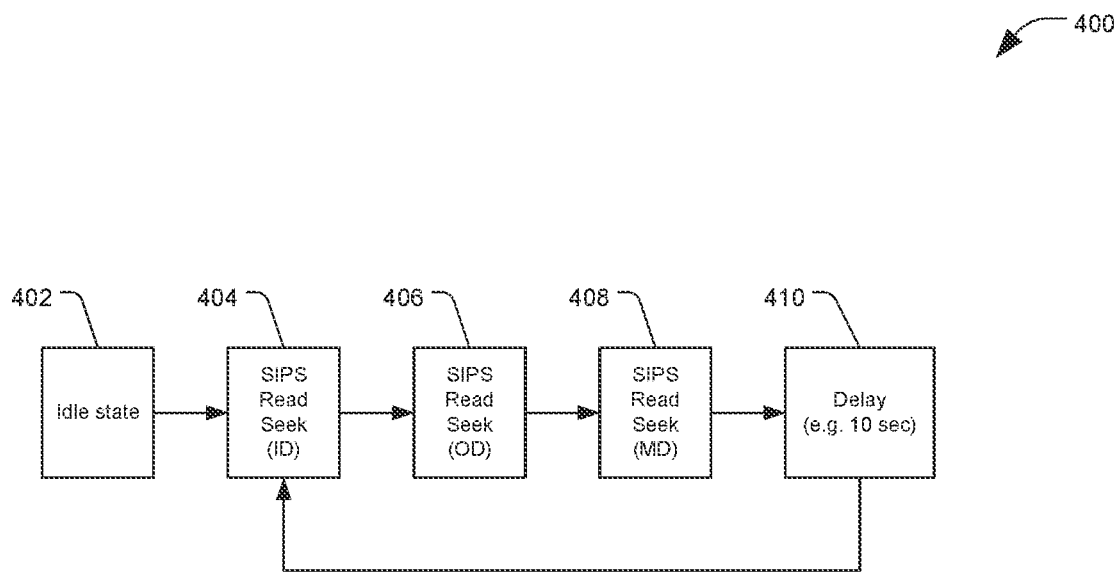
FIG. 4 is a flowchart of a process for an idle power saving mode of an actuator device, in accordance with certain embodiments of the present disclosure.

FIG. 4 is a flowchart of a process 400 for an idle power saving mode of an actuator device, in accordance with certain embodiments of the present disclosure. The process 400 may be implemented with or in an actuator device, such as actuator device 100 or 200. In some embodiments, such as shown, the process 400 can be implemented by a data storage device as a power saving method. In some embodiments, the process 400 may be implemented via controller 206, servo control 220, other circuits or logic, or any combination thereof.

Process 400 shows an example of a low power idle state. An idle state, such as for a DSD, can occur when the device determines it can enter a power saving mode (e.g., when it does not have any operations to perform). When such is determined, a device may enter a low power state, at 402, and issue one or more seek commands, which can be referred to as sweep seek commands, that move an actuator arm (e.g., to position a data transducer head) to one or more positions (e.g., track locations relative to a data storage disc while the data transducer head is not actively reading or writing data to the disc). In some examples, the device can issue a sequence of multiple sweep seek commands, such as three as depicted, that seek to a first position (e.g., a track near the ID of a data storage disc), at 404, then to a second position (e.g., a track near the OD of the data storage disc), at 406, and then to a third position (e.g., a track near the middle diameter (MD) of the data storage disc (e.g., near the center of the disc between the ID and OD)), at 408. The positions sweep seeked to may be predetermined, randomly selected, or selected via any other means. Further, a time delay, at 410, may be implemented to delay movement of the actuator before repeating a sweep seek command or sequence of sweep seek commands. In some examples, the time delay may be ten seconds or similar.

Figure 5:
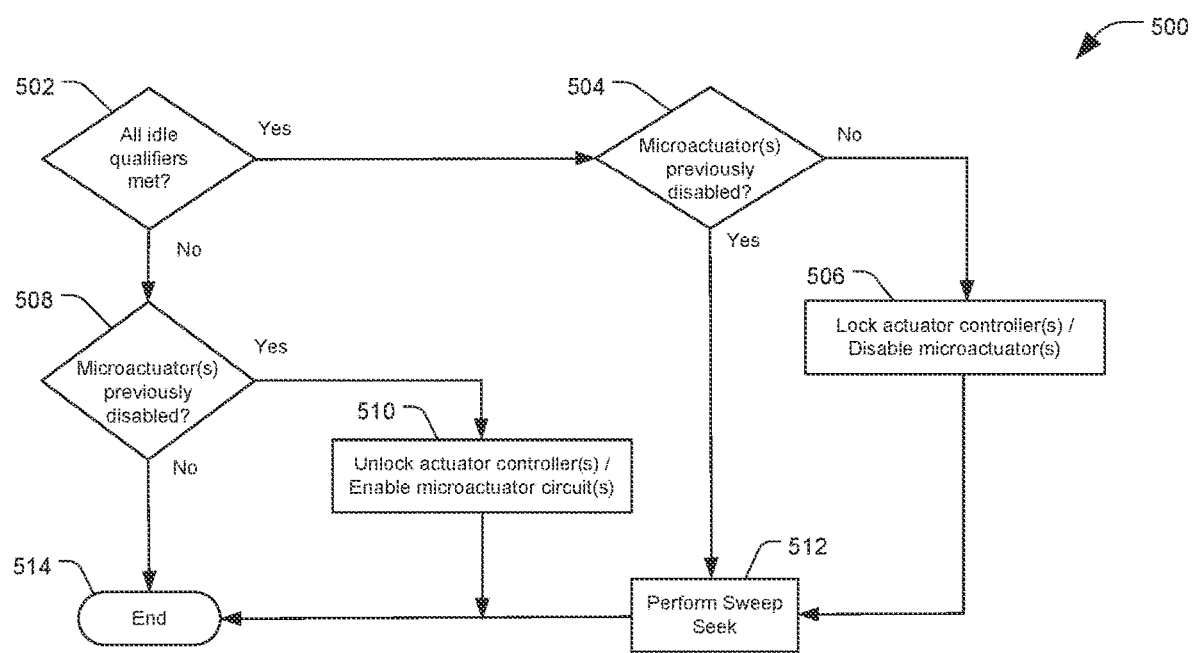
FIG. 5 is a flowchart of a process for an idle power saving mode of an actuator device, in accordance with certain embodiments of the present disclosure.

In some embodiments, a sweep seek may be implemented as a single-stage power savings (SIPS) sweep seek that switches the tracking control system(s) to a single stage actuator control; where power savings during the SIPS sweep seek comes from disabling and, thus, not utilizing one or more microactuators and their associated circuitry, which provides further reduced power consumption over merely implementing a non-SIPS sweep seeks. The power savings that comes from not utilizing the microactuator(s) and associated circuitry during a sweep seek can be implemented because tight track following is not required, thus allowing for an implementation where mere use of a VCM to position a head can save power by not further utilizing microactuator(s). Such can be implemented via firmware, control registers, logic, other circuitry, or any combination thereof. FIG. 5 gives an example implementation of a SIPS sweep seek operation.

FIG. 5 is a flowchart of a process 500 for an idle power saving mode of an actuator device, in accordance with certain embodiments of the present disclosure. The process 500 can be implemented by an actuator device, such as actuator device 100 or 200, as a power saving method. In some embodiments, the process 500 may be implemented via controller 206, servo control 220, other circuits or logic, or any combination thereof and may be implemented with process 400.

During a seek operation, the process 500 may determine if one or more qualifying conditions, or triggers, have been met, at 502. The qualifying conditions can include determining if one or more operational conditions of an actuator device (e.g., a DSD) allow the device to enter an idle power saving mode. For example, the qualifying conditions can include a sweep seek command being received, a control register being set for an idle power saving mode (e.g., a specific register indicating a sweep seek command), a low power operation mode being set (e.g., a heater being turned off via a control register), one or more other control registers being set, other conditions, or any combination thereof.

When all the qualifying conditions have been met, at 502, the servo control system, such as servo controller 220, can lock out (e.g., shut off) a multi-stage controller, disable one or more microactuators, or both, at 506. If a multi-stage controller or a microactuator has been previously disabled, it may remain disabled, at 504. Disabling the microactuator(s) from receiving or utilizing power, which may also include disabling their associated circuitry from receiving or utilizing power, can allow for power savings during a sweep seek of an idle mode. An actuator control system can implement process 500 to reduce its power consumption because locking out a multi-stage controller, disabling one or more microactuators and associated circuitry, or both can provide for a reduced power consumption by not using the disabled microactuator(s) as compared to seeks that utilize all stages of a multi-stage actuator system.

When all the qualifying conditions have not been met, at 502, the process 500 may determine whether the microactuator(s) or a multi-stage controller had been previously disabled, at 508. When such had been previously disabled, the process 500 may then unlock the multi-stage actuator, enable the microactuator(s), or both, at 510. When such had not been previously disabled, the process 500 may end, at 514.

The process 500 may be performed prior to any positional seek (e.g., each sweep seek command or seek command) being performed. A sweep seek operation can be performed after a multi-stage controller has been locked out, a microactuator disabled, or both, at 512. The disabled multi-stage controller and disabled microactuator(s) may remain disabled until a new seek command is issued or received and process 500 is repeated.

In some embodiments, all seek commands may be processed through process 500, whether they are known to be sweep seek commands or otherwise, and whether they are an internally generated seek command or an externally received seek command (e.g., a seek command related to a read or write operation received from a host).

While the examples and description herein discuss implementation of these processes with respect to an actuator of a data storage device, the processes can be implemented for any actuator control system that includes more than one actuator, such as those that do not need to maintain the highest possible precision accuracy for an actuator movement tracking system during a power saving mode. In further examples, the processes described can be implemented on systems with dual actuator structures, such as an HDD with two actuators and two data transducing heads. Further, while the descriptions herein relate to power savings during an idle mode of a HDD, the embodiments discussed herein can be applied to an HDD or other actuator system any time power savings may be desired.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   an actuator arm including a first actuator and a second actuator;
   the second actuator configured to refine a movement of the actuator arm to a more precise position than use of merely the first actuator;
   a control system configured to:
   determine when the device is in an idle state indicating the device should enter a power saving mode;
   based on the device being in the idle state, disable the second actuator to save power, and perform a positional seek operation to position the actuator arm with the second actuator disabled; and when the device is not in the idle state, perform a positional seek operation for the actuator arm utilizing the first actuator and the second actuator to position the actuator arm.

2. The device of claim 1 further comprising:

the device is a data storage device;

the actuator arm includes a data transducer head mounted in relation thereto; and a data storage disc disposed in proximity to the data transducer head, where movement of the actuator arm via the first actuator and the second actuator position the transducer head relative to locations of data tracks on the data storage disc.

3. The device of claim 2 further comprising the second actuator is a microactuator and the first actuator is a voice coil motor attached to the actuator arm.

4. The device of claim 1 further comprising the control system configured to determine when the device is in the idle state based on evaluating one or more operational conditions of the device.

5. The device of claim 4 further comprising the control system configured to, when the device is in the idle state, disable the second actuator including lock out a controller configured to control the second actuator and disable the second actuator's circuitry.

6. The device of claim 5 further comprising the control system configured to, when the device is not in the idle state, enable the second actuator including unlock the controller and enable the second actuator's circuitry.

7. The device of claim 2 further comprising the positional seek operation is a sweep seek operation that does not require tight tracking.

8. The device of claim 7 further comprising the control system configured to perform a first sweep seek operation to a first location near an inner diameter of the data storage disc, a second sweep seek operation to a second location near an outer diameter of the data storage disc, and a third sweep seek operation to a third location near a middle diameter of the data storage disc.

9. The device of claim 1 further comprising the control system configured to add a time delay after a positional seek operation is performed and before another positional seek operation is performed.

10. The device of claim 1 further comprising the second actuator is a first microactuator and the actuator arm includes a second microactuator, and the control system configured to disable both the first microactuator and the second microactuator before performing a position seek operation.

11. A device comprising:

a control system configured to be coupled to an actuator arm having a first actuator and a second actuator, the control system further configured to:

determine when the device is in an idle state indicating tight positional movement by the actuator arm is not advantageous; and based on the device being in the idle state, disable the second actuator to save power and perform a positional seek operation to position the actuator arm with the second actuator disabled.

12. The device of claim 11 further comprising the actuator arm and the second actuator configured to refine a movement of the actuator arm to a more precise position than use of merely the first actuator.

13. The device of claim 11 further comprising the control system configured to, when the device is not in the idle state, perform a positional seek operation to position the actuator arm utilizing the first actuator and the second actuator.

14. The device of claim 11 further comprising the control system configured to:

when the device is in the idle state, disable the second actuator including lock out a controller configured to control the second actuator and disable the second actuator's circuitry; and when the device is not in the idle state, enable the second actuator including unlock the controller and enable the second actuator's circuitry.

15. The device of claim 11 further comprising the control system configured to add a time delay after a positional seek operation is performed and before another positional seek operation is performed.

16. A process comprising:

implementing a device control method, the device having an actuator arm with a first actuator and a second actuator, the method including:

determining when the device is in an idle state indicating a power saving mode; and based on the device being in the idle state, disabling the second actuator to save power and performing a positional seek operation to position the actuator arm with the second actuator disabled.

17. The process of claim 16 further comprising the method including, when the device is not in the idle state, performing a positional seek operation to position the actuator arm utilizing the first actuator and the second actuator.

18. The process of claim 16 further comprising the method including:

when the device is in the idle state, disabling the second actuator including locking out a controller configured to control the second actuator and disabling the second actuator's circuitry; and when the device is not in the idle state, enabling the second actuator including unlocking the controller and enabling the second actuator's circuitry.

19. The process of claim 16 further comprising the method including adding a time delay after a positional seek operation is performed.

20. The process of claim 16 further comprising determining when the device is in the idle state based on evaluating one or more operational conditions of the device.

* * * * *